(12) United States Patent
Staun et al.

(10) Patent No.: US 11,659,634 B2
(45) Date of Patent: May 23, 2023

(54) SOUS VIDE FEATURE IN A MICROWAVE OVEN

(71) Applicant: Midea Group Co., Ltd., Foshan (CN)

(72) Inventors: Paul R. Staun, Louisville, KY (US); GuoJun Zhang, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 1090 days.

(21) Appl. No.: 16/288,532

(22) Filed: Feb. 28, 2019

(65) Prior Publication Data

US 2020/0281049 A1   Sep. 3, 2020

(51) Int. Cl.
  *H05B 6/64* (2006.01)
  *H05B 6/80* (2006.01)

(52) U.S. Cl.
  CPC .......... *H05B 6/6497* (2013.01); *H05B 6/645* (2013.01); *H05B 6/802* (2013.01)

(58) Field of Classification Search
  CPC ...... H05B 6/645; H05B 6/6497; H05B 6/802; Y02P 60/80
  USPC ....... 219/679, 712, 734, 729, 732, 687, 745, 219/730; 426/241, 243, 107, 412, 415, 426/232; 99/DIG. 14
  See application file for complete search history.

(56) References Cited

U.S. PATENT DOCUMENTS

| | | | |
|---|---|---|---|
| 4,093,841 A * | 6/1978 | Dills | H05B 6/725 |
| | | | 219/734 |
| 4,217,477 A | 8/1980 | Matsubara et al. | |
| 4,254,319 A * | 3/1981 | Beh | H05B 6/6411 |
| | | | 219/755 |
| 4,336,435 A | 6/1982 | Kashyap et al. | |
| 4,481,392 A | 11/1984 | Nibbe et al. | |
| 5,097,759 A | 3/1992 | Vilgrain et al. | |
| 5,315,083 A * | 5/1994 | Green | A47J 36/027 |
| | | | 426/243 |
| 5,750,967 A | 5/1998 | Sprauer, Jr. | |
| 6,844,535 B2 | 1/2005 | Yang | |
| 7,304,278 B2 * | 12/2007 | Kanzaki | F24C 15/327 |
| | | | 219/403 |
| 7,501,608 B2 | 3/2009 | Hallgren et al. | |

(Continued)

FOREIGN PATENT DOCUMENTS

| | | |
|---|---|---|
| CN | 101720144 A | 6/2010 |
| CN | 201550311 U | 8/2010 |

(Continued)

OTHER PUBLICATIONS

CN101720144A—Translation by ProQuest "Thawing equipment for frozen blood products", Jun. 2, 2010. (Year: 2010).*

(Continued)

*Primary Examiner* — Quang T Van
(74) *Attorney, Agent, or Firm* — Gray Ice Higdon

(57) ABSTRACT

A microwave oven may include a temperature sensor to sense temperature in a cooking cavity, and a controller that can initiate a sous vide cooking cycle in response to user input after placement of a sous vide container (with a water bath and a food item to be cooked inside) into the cooking cavity, monitor a temperature of the water bath contained by the sous vide container during the cooking cycle using the temperature sensor, and control the microwave cooking element in response to the monitored temperature.

16 Claims, 4 Drawing Sheets

(56) References Cited

U.S. PATENT DOCUMENTS

| | | | |
|---|---|---|---|
| 9,220,362 B2 | 12/2015 | Eades et al. | |
| 10,085,584 B2 | 10/2018 | Johncock et al. | |
| 10,710,773 B2 * | 7/2020 | Duan ................ | B65D 33/00 |
| 2003/0038131 A1 | 2/2003 | Nomura et al. | |
| 2016/0081372 A1 | 3/2016 | Pinto Ferreira et al. | |
| 2018/0184488 A1 | 6/2018 | Lee et al. | |

FOREIGN PATENT DOCUMENTS

| | | | |
|---|---|---|---|
| CN | 103239116 A | | 8/2013 |
| CN | 104287609 A | | 1/2015 |
| CN | 106559980 A | | 4/2017 |
| EP | 0215708 A1 | | 3/1987 |
| JP | H0410388 A | | 1/1992 |
| JP | H07190376 A | | 7/1995 |
| JP | 2002090052 A | | 3/2002 |
| JP | 2008073309 A | * | 4/2008 |
| WO | WO2013000790 A1 | | 1/2013 |
| WO | WO2016077360 A1 | | 5/2016 |
| WO | WO2018149764 A1 | | 8/2018 |

OTHER PUBLICATIONS

Video-Sovety, Chicken Breast Micro Sous Vide. Revoluation in the Kitchen? (in microwave oven), www.youtube.com, Jul. 10, 2018.
Homekozy, Reusable Food Storage Bags, www.amazon.com, Retrieved on Dec. 7, 2018.
International Search Report and Written Opinion issued in Application No. PCT/CN2019/093743 dated Nov. 18, 2019.

* cited by examiner

SOUS VIDE FEATURE IN A MICROWAVE OVEN

BACKGROUND

Sous Vide cooking has become an increasingly popular manner of cooking, as it has been found that for many foods, sous vide cooking can produce extremely tender, flavorful and consistent results. Traditional cooking typically requires a high temperature energy source to cook food from the outside until the interior of the food reaches a desired temperature; in contrast sous vide cooking involves cooking food at a much lower temperature and generally for a longer period of time. As a result, sous vide cooking is much less susceptible to burning, drying out, or otherwise overcooking the exterior of a food due to the substantially reduced temperature differential between the interior and the exterior of the food during cooking.

Typically, for sous vide cooking, the food to be cooked is placed in a bag, in some instances with spices, marinades or other flavorings. Generally, it is desirable to remove most or all of the air from the bag in order to minimize the buoyancy of the bag; therefore, in some instances, a vacuum sealer is used. The bag is then immersed in a container of water (e.g., a pot) heated to a fixed temperature, which in many instances is the desired final internal temperature of the food being cooked. Thus, for example, if it is desired to cook a medium rare steak using sous vide cooking, the water may be held at a temperature of about 130 degrees Fahrenheit. The food is then cooked for sufficient time to bring the food to the same temperature as the water throughout so that the interior of the food cooks at the same temperature as the exterior of the food.

It has been found, however, that sous vide cooking generally requires precise control over the temperature of the water throughout the cooking process, and as a result, various dedicated sous vide cooking devices, also known as immersion cookers, have been developed to address the specific needs of sous vide cooking. A typical sous vide cooking device is designed to clip onto the side of a container such as a pot and includes a heating element, a temperature sensor, and a mechanism for circulating water such that a consistent water temperature can be maintained throughout the container.

Conventional sous vide cooking devices, however, have been found to suffer from a number of drawbacks. For example, conventional sous vide devices are separate kitchen appliances that must be purchased and stored by a user. Furthermore, these devices typically sit in a pot of water or have a water reservoir built-in, and typically specify that the water be pre-heated before the food is placed in the water. Additionally, conventional sous vide systems typically couple to the side of the pot or water reservoir, thus limiting the ability to use a lid, which may be energy inefficient as heat is capable of escaping into the surrounding air.

SUMMARY

The herein-described embodiments address these and other problems associated with the art by providing a microwave oven with a dedicated sous vide cooking cycle. In one aspect, such an microwave oven includes: a housing with a cooking cavity; a microwave cooking element located within the housing capable of generating cooking energy in the cooking cavity; a temperature sensor positioned to sense temperature within the cooking cavity; and a controller located in the housing that is configured to initiate a dedicated sous vide cooking cycle in response to user input and after placement of a sous vide container containing a water bath and a food item to be cooked into the cooking cavity, monitor a temperature of the water bath contained by the sous vide container during the dedicated sous vide cooking cycle using the temperature sensor, and control the microwave cooking element in response to the monitored temperature to maintain a substantially constant temperature for the water bath during at least a portion of the dedicated sous vide cooking cycle.

In some embodiments, the microwave oven additionally includes a rotating turntable assembly located in the cooking cavity. In some embodiments, the temperature sensor is an infrared sensor, and the temperature sensor wirelessly senses temperature within the cooking cavity. In some embodiments, the temperature sensor is a probe wired to the controller. In other embodiments, the temperature sensor is disposed on a side wall of the cooking cavity. In still other embodiments, the temperature sensor is disposed on an upper surface of the cooking cavity.

In some embodiments, the sous vide container further comprises a lid. In some embodiments, the food item is disposed within a sous vide bag that is submerged in the water bath, and the sous vide container also includes an adjustable spacer configured to keep the sous vide bag submerged in the water bath. In some embodiments, the adjustable spacer is attached to the lid. In other embodiments, the adjustable spacer includes one or more plastic coil springs.

In some embodiments, the controller is also configured to follow a predetermined temperature profile during the dedicated sous vide cooking cycle. In other embodiments, the controller is configured to control the microwave cooking element in response to the monitored temperature by cycling the microwave cooking element. In still other embodiments, the controller is configured to control the microwave cooking element in response to the monitored temperature by adjusting a power output of the microwave cooking element.

In another aspect, a microwave oven disclosed herein includes: a housing including a cooking cavity; a microwave cooking element located within the housing to generate cooking energy within the cooking cavity; a temperature sensor positioned to wirelessly sense temperature within the cooking cavity; and a controller disposed in the housing and configured to: initiate a cooking cycle in response to user input and after placement of a sous vide container containing a water bath and a food item to be cooked into the cooking cavity, monitor a temperature of the water bath contained by the sous vide container during the cooking cycle using the temperature sensor, and control the microwave cooking element in response to the monitored temperature to maintain a substantially constant temperature for the water bath during at least a portion of the cooking cycle.

In some embodiments, the cooking cycle is a dedicated sous vide cycle and where the temperature sensor is an infrared sensor. In some embodiments, the controller is further configured to follow a predetermined temperature profile during the dedicated sous vide cooking cycle. In some embodiments, the controller is configured to control the microwave cooking element in response to the monitored temperature by cycling the microwave cooking element. In other embodiments, the controller is configured to control the microwave cooking element in response to the monitored temperature by adjusting a power output of the microwave cooking element.

In some embodiments, the microwave oven additionally includes a rotating turntable assembly disposed in the cooking cavity. In some embodiments, the temperature sensor is disposed on a side wall of the cooking cavity. In other embodiments, the temperature sensor is disposed on an upper surface of the cooking cavity.

In some embodiments, the sous vide container further comprises a lid. In other embodiments, the food item is disposed within a sous vide bag that is submerged in the water bath, and the sous vide container further comprises an adjustable spacer configured to keep the sous vide bag submerged in the water bath. In still other embodiments, the adjustable spacer is attached to the lid. In some embodiments, the adjustable spacer includes one or more plastic coil springs.

In another aspect, a container for use in sous vide cooking in a microwave oven is disclosed herein, the container including: a body configured to contain a water bath; a lid configured to couple with an open top side of the body; a spacer disposed between the body and the lid, where the spacer is configured to retain a buoyant sous vide bag in a submerged position within the water bath contained by the body of the container.

In some embodiments, the spacer is adjustable. In other embodiments, the spacer is attached to the lid. In still other embodiments, the spacer includes one or more plastic coil springs, where each of the one or more springs further comprise a first end and a second end, and the first end is configured to abut the buoyant sous vide bag and the second end is coupled with an interior surface of the lid.

In another aspect, a method of cooking in a microwave oven is disclosed, where the microwave oven includes a housing with a cooking cavity, a microwave cooking element located in the housing to generate cooking energy in the cooking cavity, and a controller in the housing, the method including: initiating, by the controller, a cooking cycle in response to user input and after placement of a sous vide container containing a water bath and a food item in a BoPET (biaxially-oriented polyethylene terephthalate) bag to be cooked into the cooking cavity; monitoring, by a temperature sensor, a temperature of the water bath contained by the sous vide container during the cooking cycle; and controlling, by the controller, the microwave cooking element in response to the monitored temperature to maintain a substantially constant temperature for the water bath during at least a portion of the cooking cycle.

In some embodiments, the cooking cycle is a dedicated sous vide cycle. In some such embodiments, controlling the microwave cooking element may further include following a predetermined temperature profile during the dedicated sous vide cooking cycle. In other such embodiments, controlling the microwave cooking element may further include cycling the microwave cooking element. In still other such embodiments, controlling the microwave cooking element may further include adjusting a power output of the microwave cooking element.

In some embodiments, the microwave oven further includes a rotating turntable assembly disposed in the cooking cavity of the housing and the method further comprises controlling, by the controller, the rotation of rotating turntable in response to user input. In some embodiments, monitoring the temperature of the water bath further includes wirelessly sensing, by the temperature sensor, the temperature of the water bath.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

In some embodiments discussed hereinafter, a microwave oven may include a temperature sensor to sense the temperature within the cooking cavity of the microwave oven, e.g., using infrared or another wireless temperature sensing technology. The microwave oven may also include a controller that is capable of initiating a dedicated sous vide cooking cycle in response to various user inputs. In addition, as will also become more apparent below, some embodiments may also support the use of container configured for use in sous vide cooking in a microwave oven. The container may be used, for example, to hold a sous vide bag in a water bath within the container so that a food item in the sous vide bag may be cooked to a desired temperature.

Figure 1:
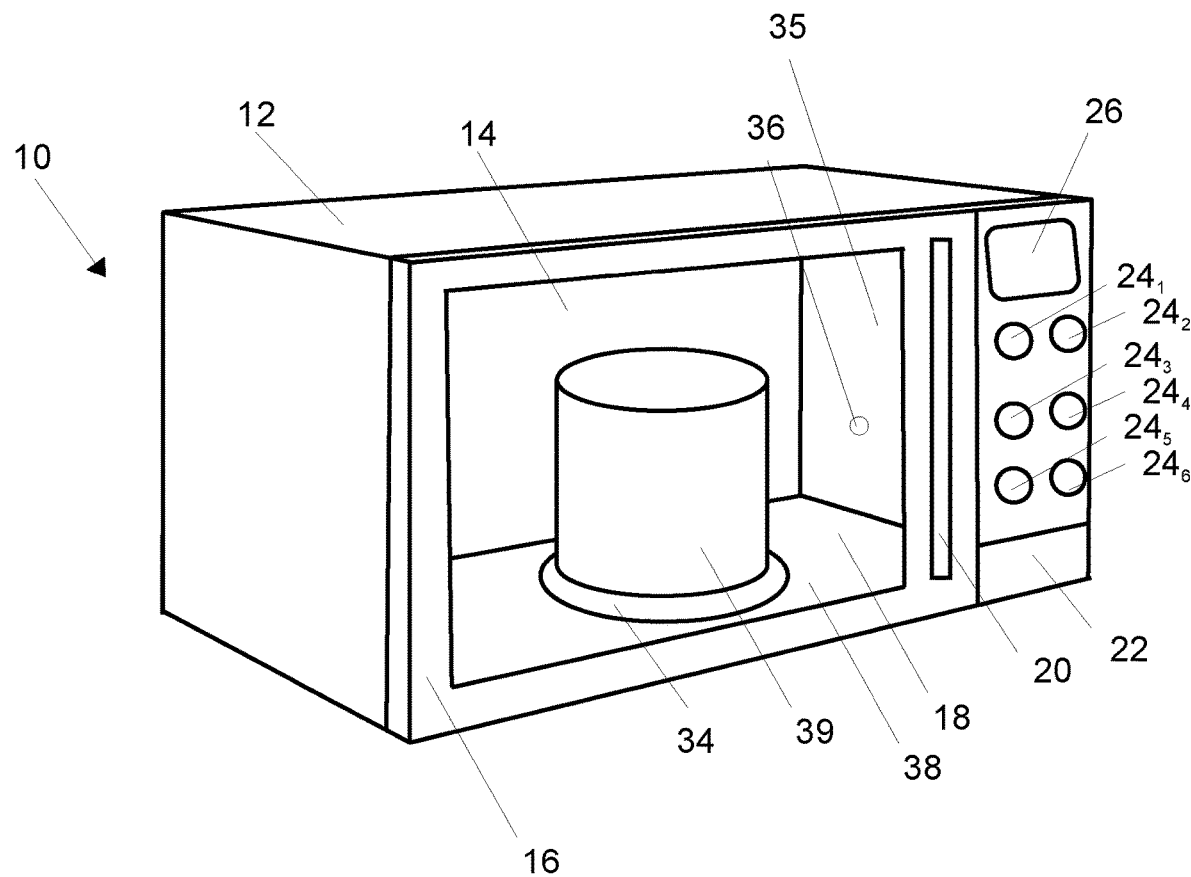
FIG. 1 is a perspective view of a microwave oven consistent with some embodiments of the invention.
Figure 2:
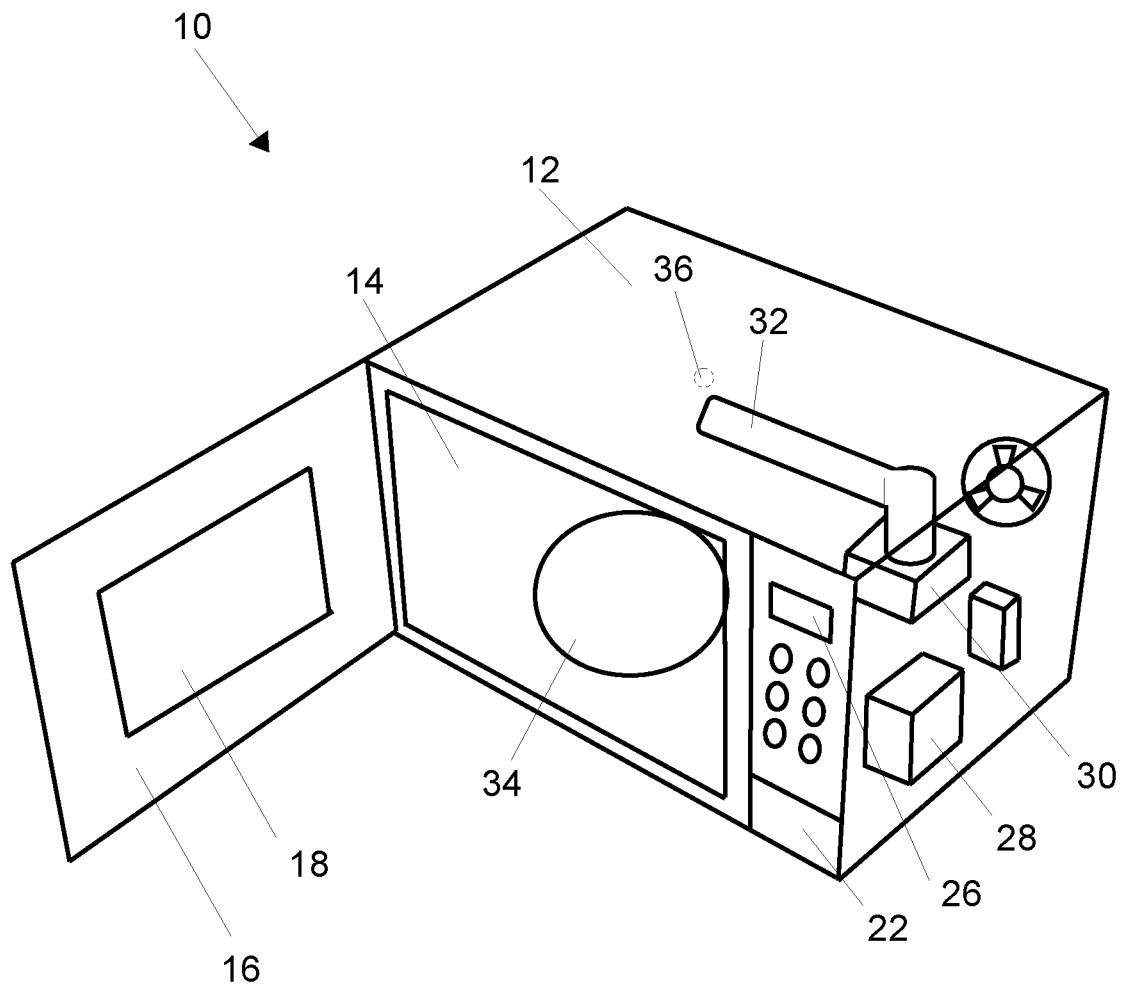
FIG. 2 is a perspective view of the microwave oven of FIG. 1 with various internal components of the microwave oven illustrated.

Turning now to the drawings, wherein like numbers denote like parts throughout the several views, FIGS. 1 and 2 illustrate an example microwave oven 10 in which the various technologies and techniques described herein may be implemented. Microwave oven 10 is a residential-type microwave oven, and as such includes a housing 12, which further includes a cooking cavity 14, as well as a door 16 disposed adjacent the respective opening of the cooking cavity 14. In some embodiments, the door 16 may further include a window 18 that allows a user to view the items inside the cooking cavity 14 and a handle 20. In other embodiments, in place of, or in addition, to the handle 20, the microwave oven 10 may include a button 22 that a user may press to trigger the opening of the door 16.

The microwave oven 10 may also include one or more user activated controls $24_{1-n}$, which may be in the form of buttons, knobs, a touchscreen, or the like. In some embodiments, these user activated controls $24_{1-n}$ may be used to preprogram a cooking time and/or a cooking temperature. In other embodiments, these user activated controls $24_{1-n}$ may be used to selected one or more preset conditions for a particular food item to be cooked or a particular desired action (e.g. "popcorn", "defrost", "frozen pizza", etc.). In some embodiments, the preset conditions may include a dedicated sous vide cycle, which is described in greater detailed herein. The microwave oven 10 may also include a display 26, which may be used to convey a variety of information to a user. For example, in some embodiments, the display 26 may be used to display the time when the microwave oven 10 is not in use. In other embodiments, the display 26 may be used to display cooking times and/or temperatures.

Referring particularly to FIG. 2, various internal components of the microwave oven 10 are illustrated. A transformer 28 may covert standard 120 volt household electricity to about 4,000 volts (or higher depending on the specific microwave oven) in order to provide power to one or more cooking elements (i.e., a magnetron) 30. This conversion allows the magnetron or microwave cooking element 30 to generate microwaves from the increased voltage. This increased voltage may heat a filament (not shown) at the center of the microwave cooking element 30, which results in the release of electrons. The movement of these electrons throughout the microwave cooking element 30 may be facilitated by magnets, which may be, for example, shaped in the form of rings, which generate microwaves at a desired frequency. Typically, household microwave ovens operate at a microwave frequency of about 2.45 gigahertz; however, this is not intended to be limiting, and in some embodiments may vary. Once generated at the desired frequency, the microwaves are transmitted into and throughout the cooking cavity 14 by an antenna 32 coupled with the microwave cooking element 30. The microwaves bounce around the cooking cavity 14 and penetrate the food item(s) during the operation of the microwave oven 10, which results in the heating (and cooking) of the food item(s).

The microwave oven 10 may further include a turntable assembly 34 disposed inside the cooking cavity 14. In some embodiments, the turntable assembly 34 may be positioned centrally in the cooking cavity 14; although this is not intended to be limiting. One or more food items may be placed on the turntable assembly 34, so that as the turntable assembly 34 rotates so do the one or more food items contained thereon. This rotation may facilitate more even heating (or cooking) of the food item(s). In some instances, such a turntable may be configured to be turned on, off, or otherwise controlled (e.g. speed) in response to various user inputs.

Additionally, the microwave oven 10 may include a temperature sensor 36 positioned so as to be able to sense a temperature within the cooking cavity. In some instances, the temperature sensor 36 may be located on a sidewall 35 of the cooking cavity 14 and may be capable of wirelessly sensing temperature. For example, in some embodiments, such a temperature sensor 36 may be positioned approximately one-third to one-half-way up the sidewall 35 from the bottom surface 38, so as to allow the temperature sensor 36 to be able to sense the temperature of a water bath used for sous vide cooking (described in detail herein). In other instances, the temperature sensor 36 may be located on an upper surface of the cooking cavity (illustrated in FIG. 2 with broken line). The temperature sensor 36 may be an infrared (IR) sensor, although this is not to be understood as limiting as any temperature sensor temperature capable of functioning without interfering with the microwave energy used within the cooking cavity 14 may be used. In some instances, in particular where sous vide cooking is desired, the IR sensor may be calibrated to read the temperature of a water bath with a container 39. Other temperature sensors capable of wirelessly sensing temperature, e.g., thermal imaging sensors, may also be used. In addition, other temperature sensors, e.g., wired probes, turntable-mountable sensors, immersible sensors, etc., may also be used in other embodiments, although it will be appreciated that a wall-mounted sensor such as an IR sensor provides advantages in terms of being unobtrusive and not requiring substantial user intervention.

Figure 3:
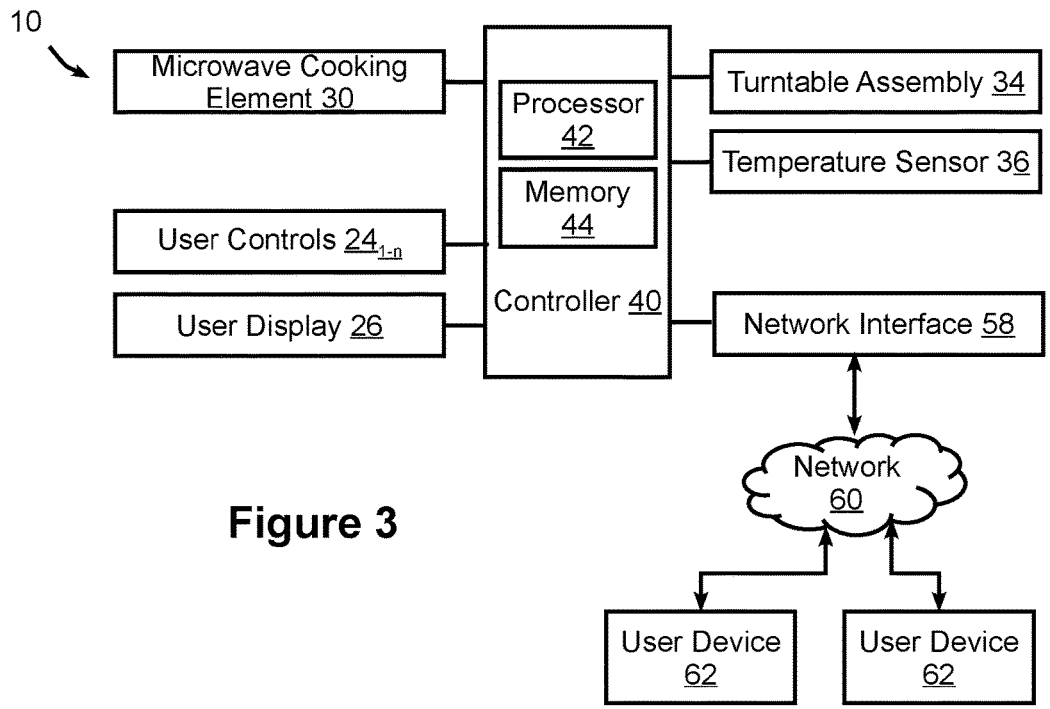
FIG. 3 is a block diagram of an example control system for the microwave oven of FIG. 1.

A microwave oven consistent with the description herein may also generally include one or more controllers configured to control the operation of the microwave oven 10 as well as manage interaction with a user. FIG. 3, for example, illustrates an example embodiment of a microwave oven 10 including a controller 40 that receives inputs from a number of components and drives a number of components in response thereto. Controller 40 may, for example, include one or more processors 42 and a memory 44 within which may be stored program code for execution by the one or more processors. The memory may be embedded in controller 40, but may also be considered to include volatile and/or non-volatile memories, cache memories, flash memories, programmable read-only memories, read-only memories, etc., as well as memory storage physically located elsewhere from controller 40, e.g., in a mass storage device or on a remote computer interfaced with controller 40.

As shown in FIG. 3, controller 40 may be interfaced with various components, including a microwave cooking element 30, a motor or other drive for turntable assembly 34, one or more user activated controls $24_{1-n}$ for receiving user input (e.g., various combinations of switches, knobs, buttons, sliders, touchscreens or touch-sensitive displays, microphones or audio input devices, image capture devices, etc.), and one or more displays 26 (including various indicators, graphical displays, textual displays, speakers, etc.), as well as various additional components suitable for use in a microwave oven.

Controller 40 may also be interfaced with a temperature sensor 36 that is capable of sensing a temperature within the cooking cavity 14. In some embodiments, the temperature sensor 36 may sense temperature wirelessly, and in some embodiments, temperature sensor 36 may also be wirelessly coupled to controller 40; although in other embodiments, the temperature sensor 36 may be coupled to the controller 40 through one or more wired connections.

In some embodiments, controller 40 may also be coupled to one or more network interfaces 58, e.g., for interfacing with external devices via wired and/or wireless networks such as Ethernet, Wi-Fi, Bluetooth, NFC, cellular and other suitable networks, collectively represented in FIG. 3 at 60. Network 60 may incorporate in some embodiments a home automation network, and various communication protocols may be supported, including various types of home automation communication protocols. In other embodiments, other wireless protocols, e.g., Wi-Fi or Bluetooth, may be used.

In some embodiments, microwave oven 10 may be interfaced with one or more user devices 62 over network 60, e.g., computers, tablets, smart phones, wearable devices, etc., and through which microwave oven 10 may be controlled and/or microwave oven 10 may provide user feedback.

In some embodiments, controller 40 may operate under the control of an operating system and may execute or otherwise rely upon various computer software applications, components, programs, objects, modules, data structures, etc. In addition, controller 40 may also incorporate hardware logic to implement some or all of the functionality disclosed herein. Further, in some embodiments, the sequences of operations performed by controller 40 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized, and/or supplemented with other techniques known in the art, and therefore, the invention is not limited to the particular sequences of operations described herein.

Numerous variations and modifications to the microwave oven illustrated in FIGS. 1-3 will be apparent to one of ordinary skill in the art, as will become apparent from the description below. Therefore, the invention is not limited to the specific implementations discussed herein.

Figure 4:
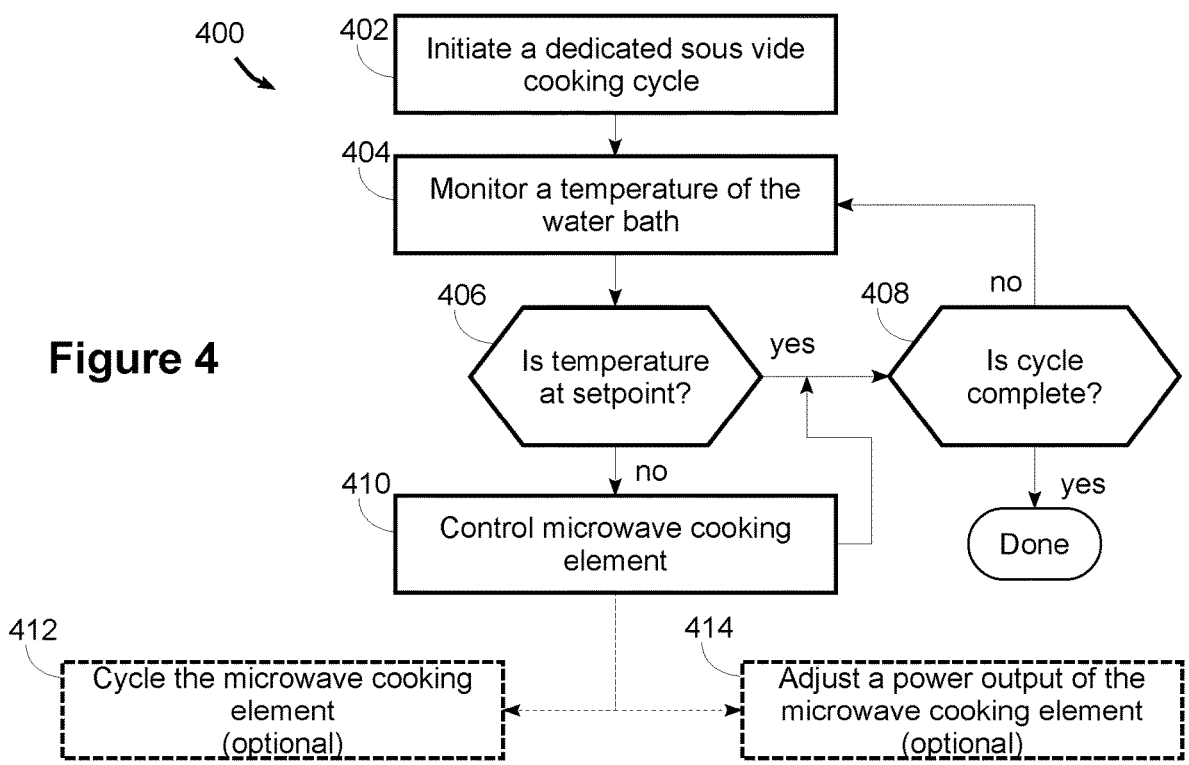
FIG. 4 is an operational flow for sous vide cooking in a microwave oven consistent with some embodiments of the invention.

Now turning to FIG. 4, an example embodiment of an operational flow 400 for a sous vide cooking in microwave oven 10, such as illustrated in FIGS. 1-3 and described herein. In block 402, a dedicated sous vide cooking cycle is initiated by the controller in response to user input. The user may also place a sous vide container (described with reference to FIG. 5) containing a water bath into the cooking cavity. This user input may include only the selection of the dedicated sous vide cycle; however, in some instances the user may also select from various preprogramed options of food type (e.g. fish, beef, pork, etc.) being cooked via the sous vide cycle. In other instances, the user may also input how well the food is to be cooked (e.g. rare, medium rare, medium, medium well, etc.). The cooking temperature and cooking time may vary based on the user inputs, e.g. using predetermined temperatures and times associated with combinations of food types and how well the food is to be cooked, or based on manually input temperatures and/or times. In some instances, the water may be preheated to the desired temperature before the user places the container within the cooking cavity; however, this is not to be understood as limiting, as the dedicated sous vide cooking cycle may also be used to initially bring the water to the desired temperature, thus eliminating the need for preheating the water. Further, in some embodiments a sous vide cooking cycle may be configured to preheat the water prior to inserting the food into the water bath (i.e. with only water in the container), so the controller may be configured to pause the cooking cycle once the desired temperature of the water bath is reached and alert a user to insert the food into the container and restart the cooking cycle (while optionally maintaining the water bath at the desired temperature until the user has opened the microwave after being alerted to insert the food).

In block 404, the temperature sensor wirelessly senses the temperature of the water bath within the sous vide container. At the initiation of the dedicated sous vide cooking cycle the microwave may heat the water to a desired temperature setpoint as determined by the various user inputs. The temperature sensor may then continue to monitor the temperature of the water bath throughout the cooking cycle. In some instances, a temperature measurement may be taken every minute; in other instances, a temperature measurement may be taken every five minutes, every ten minutes, every second, every few seconds, or any other higher or lower frequency. A uniform temperature throughout the water bath within the container may also be maintained through use of a rotating turntable, which allows for even heating of the water bath, and thus eliminate the need for separate water circulation in some embodiments (although a separate water circulating device could also be used in some embodiments).

Sous vide cooking typically requires precise temperature control, as such, in block 406 the controller determines if the temperature of the water bath in the container is at the desired setpoint. Where the temperature of the water bath is the desired temperature setpoint, or within a desired temperature range (e.g. within 1 or 2 degrees, or some other range), block 406 passes control to block 408 to determine if the cooking cycle is complete, and if not, block 408 passes control to block 404 whereby the controller continues to monitor the temperature using the temperature sensor at a predetermined frequency. However, returning to block 406, if the temperature of the water bath is not at the desired temperature setpoint or within the desired temperature range control may pass to block 410, whereby the microwave cooking element may be controlled in order to maintain a substantially constant temperature, and then to block 408 to determine if the cooking cycle is complete.

Such control of the microwave cooking element in block 410 may be in multiple forms. For example, in some instances (e.g. optional block 412), the microwave cooking element may be cycled on or off in order to increase or decrease the temperature of the water bath as needed to maintain the desired temperature or range of temperatures. Once the water bath has reached the desired temperature, the microwave cooking element may only need to be cycled on a few times each hour in order to maintain the desired temperature; however, the size of the container, the volume of water, the effectiveness of heat retention of the container, etc. may all effect the length and number of times the microwave cooking element needs to be cycled on or off. In other instances (e.g. optional block 414), controlling of the microwave cooking element may include adjusting the power output of the microwave cooking element in order to raise or lower the temperature of the water bath. In some embodiments a combination of varying the power output and varying the duty cycle of the microwave cooking element may also be used.

Although described in terms of reaching a desired temperature or temperature range, this is not intended to be limiting, as in some instances it may be desirable for the dedicated sous vide cycle to follow a preprogramed cooking cycle where the temperature of the water bath is held at different temperatures at different times. Different foods, for example, may have different preprogrammed cooking profiles that are designed to hold the water bath at different temperatures at different points in a cooking cycle.

Returning to block 408, as noted above, block 408 returns control to block 404 if a cooking cycle is not complete. If, however, the cooking cycle is determined to be complete (e.g., if a predetermined time has been reached), the operational flow is complete. At this time, for example, a user may be alerted that the cycle is complete via one or more audio and/or visual alerts, and the cooking element may be deactivated.

Figure 5:
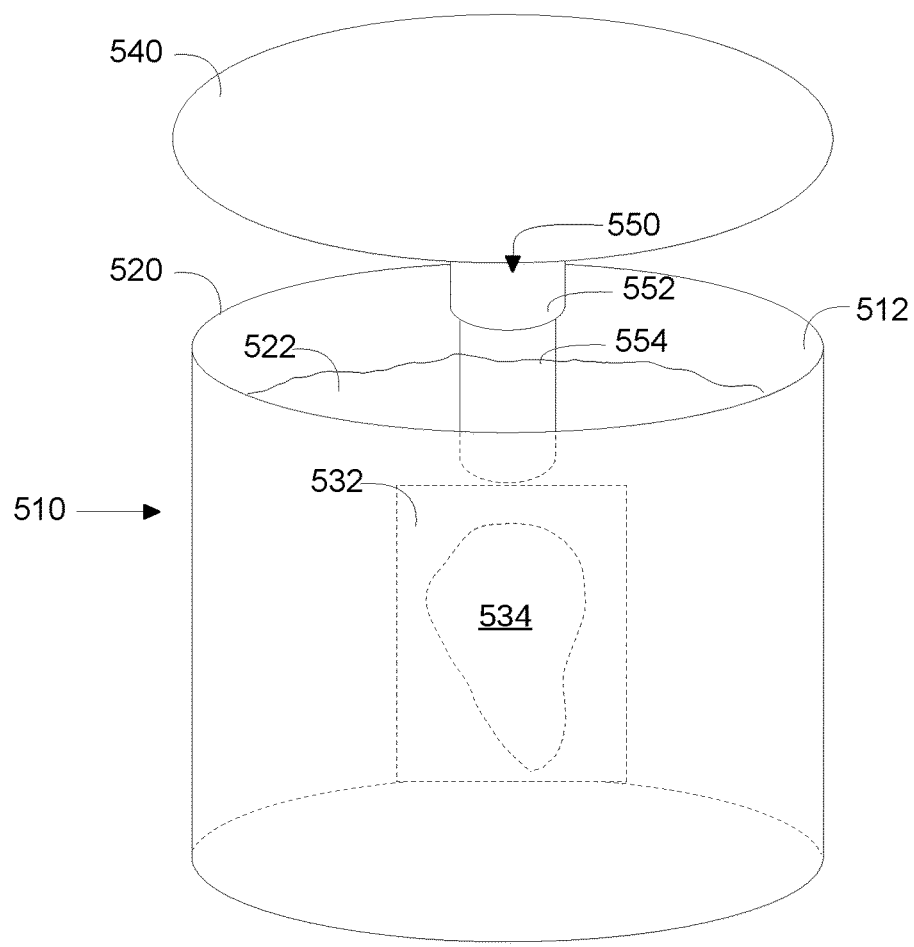
FIG. 5 is a perspective view of a container configured for use in sous vide cooking in a microwave oven consistent with some embodiments of the invention.

An exemplary container 510 for use in microwave sous vide cooking is illustrated in FIG. 5. Such a container 510 may include a body 520 for containing a water bath 522, which may be constructed of any microwave safe material (e.g. glass, plastic, or the like). Generally, during sous vide cooking, one or more food items are placed in container 510 and immersed in water 522. The food items are usually placed bags or otherwise sealed such that the food items do not physically contact or mix with water 522. FIG. 5, for example, illustrates a bag 532 containing a chicken breast 534. In some instances, sous vide cooking in a microwave oven may require a specialized bag 532 in order to protect the food item inside from being cooked by the microwave energy when the microwave cooking element is on One such example of a specialized bag may be a bag constructed of BoPET (biaxially-oriented polyethylene terephthalate). BoPET is a polyester film constructed from stretched polyethylene terephthalate (PET), and is chemically and dimensionally stable with gas and aroma barrier properties, and/or electrical insulation properties. Various brands of BoPET are known in the art and may be used as the sous vide bag, for example, Mylar®, Melinex®, or Hostaphan® may be used to protect the food item from the microwave energy, but this is not intended to be limiting. In another example, the food item (e.g. chicken) may be wrapped in aluminum foil prior to being submerged in the water bath; the aluminum foil, similar to the BoPET, may protect the food item inside from being cooked by the microwave cooking element. It is generally desirable for air to be removed from each bag prior to cooking, e.g., using a vacuum sealer or through manual expelling of air from the bag prior to closure, to minimize the buoyancy of the bag when immersed in the container of water.

In some instances, the container 510 may include a lid 540 that removably couples with the top portion 512 of the container 510. In some instances, the lid 540 may simply sit on the container 510; while in other instances the lid may seal with the top portion 512 of the container 510, for example through a silicone seal, one or more snaps on the side, or the like. A lid 540 may be particularly advantageous for retaining heat within the container 510, which in some instances, may minimize the number of times the microwave cooking element may need to be cycled on during a dedicated sous vide cycle.

Figure 6:
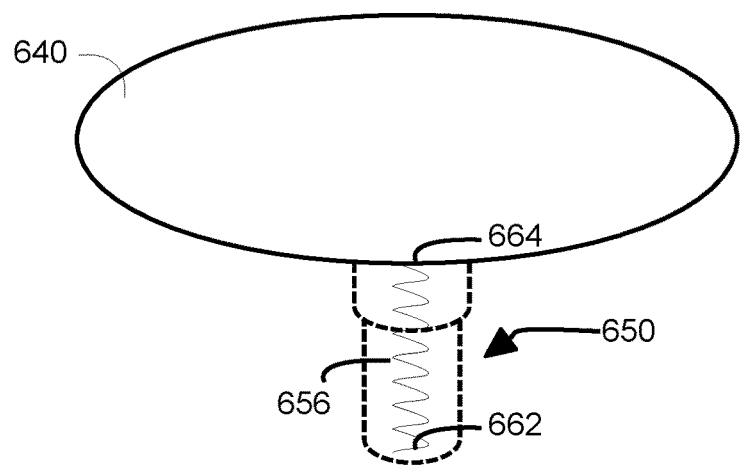
FIG. 6 is a perspective view of a lid for a container configured for use in sous vide cooking in a microwave oven consistent with some embodiments of the invention.

The container 510 may also include a spacer 550 that is configured to counteract the natural buoyancy of the sous vide bag 532 and retain the bag 532 in a submerged position within the water bath 522. In some instances, the spacer 550 may be adjustable so as to allow for the bag 532 to be submerged at varying depths, or to allow the water bath 522 to be varying volumes depending on the size of the bag 532. For example, the spacer 550 may include two pieces 552, 554 configured to allow for adjustability. In some instances, such as illustrated in FIG. 5, the first piece 552 may be fixed to the lid 510 and receive the second piece 554 that may telescope (e.g. through rotation along interior threading) towards the bag 534. In other instances, such as illustrated in FIG. 6, the spacer 650 may be a spring 656 configured so that a first end 662 contacts the bag and a second end 664 is attached to the lid 640. Alternatively, the spring 656 may be contained within an adjustable housing (illustrated in broken line), similar to the two piece construction discussed with reference to FIG. 5, such that a first end 662 of the spring may come into contact with the bag indirectly through the housing.

It will be appreciated that various modifications may be made to the embodiments discussed herein, and that a number of the concepts disclosed herein may be used in combination with one another or may be used separately. Therefore, the invention lies in the claims hereinafter appended.

What is claimed is:

1. A microwave oven, comprising:
a housing including a cooking cavity;
a magnetron disposed within the housing to generate cooking energy within the cooking cavity;
a temperature sensor positioned to sense temperature within the cooking cavity of the housing; and
a controller disposed in the housing and configured to:
initiate a dedicated sous vide cooking cycle in response to user input and after placement of a sous vide container containing a water bath and a food item to be cooked into the cooking cavity;
monitor a temperature of the water bath contained by the sous vide container during the dedicated sous vide cooking cycle using the temperature sensor; and
control the magnetron in response to the monitored temperature to maintain a substantially constant temperature for the water bath during at least a portion of the dedicated sous vide cooking cycle;
wherein controlling the magnetron in response to the monitored temperature includes maintaining a power output to the magnetron and adjusting the power output of the magnetron.

2. The microwave oven of claim 1 further comprising a rotating turntable assembly disposed in the cooking cavity of the housing configured to be controlled, by the controller, in response to user input.

3. The microwave oven of claim 1, wherein the temperature sensor is an infrared sensor, and wherein the temperature sensor wirelessly senses temperature within the cooking cavity of the housing.

4. The microwave oven of claim 1, wherein the temperature sensor is a probe wired to the controller.

5. The microwave oven of claim 1, wherein the temperature sensor is disposed on a side wall of the cooking cavity.

6. The microwave oven of claim 1, wherein the temperature sensor is disposed on an upper surface of the cooking cavity.

7. The microwave oven of claim 1, wherein the sous vide container further comprises a lid.

8. The microwave oven of claim 7, wherein the food item is disposed within a biaxially-oriented polyethylene terephthalate sous vide bag that is submerged in the water bath, and wherein the sous vide container further comprises an adjustable spacer configured to keep the sous vide bag submerged in the water bath.

9. The microwave oven of claim 8, wherein the adjustable spacer is attached to the lid.

10. The microwave oven of claim 8, wherein the adjustable spacer includes one or more plastic coil springs.

11. The microwave oven of claim 1, wherein the controller is further configured to follow a predetermined temperature profile during the dedicated sous vide cooking cycle.

12. A microwave oven, comprising:
a housing including a cooking cavity;
a magnetron disposed within the housing to generate cooking energy within the cooking cavity;
a temperature sensor positioned to wirelessly sense temperature within the cooking cavity of the housing; and
a controller disposed in the housing and configured to:
initiate a cooking cycle in response to user input and after placement of a sous vide container containing a water bath and a food item to be cooked into the cooking cavity;
monitor a temperature of the water bath contained by the sous vide container during the cooking cycle using the temperature sensor; and control the magnetron in response to the monitored temperature to maintain a substantially constant temperature for the water bath during at least a portion of the cooking cycle;

wherein controlling the magnetron in response to the monitored temperature includes maintaining a power output to the magnetron and adjusting the power output of the magnetron.

13. The microwave oven of claim 12, wherein the cooking cycle is a dedicated sous vide cycle and wherein the temperature sensor is an infrared sensor.

14. The microwave oven of claim 13, wherein the controller is further configured to follow a predetermined temperature profile during the dedicated sous vide cooking cycle.

15. A container configured for use in sous vide cooking in a microwave oven, the container comprising:

a body configured to contain a water bath;

a lid configured to couple with an open top side of the body;

an adjustable spacer including one or more springs disposed between the body and the lid, wherein the spacer is configured to retain a buoyant sous vide bag in a submerged position within the water bath contained by the body of the container.

16. A method of sous vide cooking in a microwave oven, wherein the microwave oven includes a housing including a cooking cavity, a magnetron disposed within the housing to generate cooking energy within the cooking cavity, and a controller disposed in the housing, the method comprising:

initiating, by the controller, a cooking cycle in response to user input and after placement of a sous vide container containing a water bath and a food item in a biaxially-oriented polyethylene terephthalate bag to be cooked into the cooking cavity;

monitoring, by a temperature sensor, a temperature of the water bath contained by the sous vide container during the cooking cycle; and controlling, by the controller, the magnetron in response to the monitored temperature to maintain a substantially constant temperature for the water bath during at least a portion of the cooking cycle wherein controlling the magnetron in response to the monitored temperature includes maintaining a power output to the magnetron and adjusting the power output of the magnetron.

* * * * *